(12) United States Patent
Greeno

(10) Patent No.: US 11,691,572 B2
(45) Date of Patent: Jul. 4, 2023

(54) OFF-ROAD VEHICLE UTILITY RACK APPARATUS

(71) Applicant: Ricky L. Greeno, Bristol, WI (US)

(72) Inventor: Ricky L. Greeno, Bristol, WI (US)

( * ) Notice: Subject to any disclaimer, the term of this patent is extended or adjusted under 35 U.S.C. 154(b) by 0 days.

(21) Appl. No.: 17/943,553

(22) Filed: Sep. 13, 2022

(65) Prior Publication Data
US 2023/0001858 A1 Jan. 5, 2023

(51) Int. Cl.
*B60R 9/06* (2006.01)
*B62D 43/02* (2006.01)
*B60R 11/00* (2006.01)

(52) U.S. Cl.
CPC ............... *B60R 9/06* (2013.01); *B62D 43/02* (2013.01); *B60R 2011/005* (2013.01)

(58) Field of Classification Search
CPC ...... B60R 9/06; B60R 2011/005; B62D 43/02
USPC .... 224/401, 274, 408, 282, 288; 211/19, 20, 211/23, 163, 165, 168, 170, 171, 172, 211/173
See application file for complete search history.

(56) References Cited

U.S. PATENT DOCUMENTS

| | | | |
|---|---|---|---|
| 6,095,745 A | 8/2000 | Garnett | |
| 7,293,681 B2 | 11/2007 | Wills | |
| 8,463,765 B2 | 6/2013 | Lesavich | |
| 8,578,647 B2 * | 11/2013 | Storch | F41G 11/003 248/187.1 |
| 9,037,564 B2 | 5/2015 | Lesavich et al. | |
| 9,061,830 B2 | 6/2015 | Miller et al. | |
| 9,137,250 B2 | 9/2015 | Lesavich et al. | |
| 9,260,247 B2 | 2/2016 | Miller et al. | |
| 9,352,698 B2 | 5/2016 | Romanelli | |
| 9,361,479 B2 | 6/2016 | Lesavich et al. | |
| 9,569,771 B2 | 2/2017 | Lesavich et al. | |
| 9,623,807 B2 | 4/2017 | Singleton | |
| 9,718,411 B2 | 8/2017 | Field, Jr. | |
| 9,745,133 B2 | 8/2017 | Miller et al. | |
| 10,065,801 B2 | 9/2018 | Miller et al. | |
| 10,384,617 B1 * | 8/2019 | Keyser | B60R 9/06 |
| 10,464,754 B2 | 11/2019 | Miller et al. | |
| 11,027,662 B2 | 6/2021 | Morgan et al. | |
| 11,066,243 B2 | 7/2021 | Bacon-Maldonado, III et al. | |
| 2005/0023315 A1 * | 2/2005 | Skinner | B62D 43/02 224/42.21 |
| 2005/0082329 A1 | 4/2005 | Cohen | |
| 2006/0104767 A1 * | 5/2006 | Dugger | B60R 9/06 414/462 |

(Continued)

*Primary Examiner* — Lynn E Schwenning
(74) *Attorney, Agent, or Firm* — Lesavich High-Tech Law Group, S.C.; Stephen Lesavich

(57) ABSTRACT

An off-road vehicle utility rack apparatus. The off-road vehicle utility rack apparatus allows a spare tire to be attached to a top surface and a fuel container or other container (e.g., water, tool, suitcase, etc.) to be stored on a bottom surface of the off-road vehicle utility rack apparatus. The off-road vehicle utility rack apparatus attaches directly to integral structural components of the off-road vehicle (e.g., ATV, UTV, OHV, etc.) does not interfere with items (e.g., tool box, suitcase, etc.) stored in integral storage space on the off-road vehicle. The off-road vehicle utility rack apparatus is dynamically lifted in an up and down direction to allow easy access to the fuel container and/or the items stored in the integral storage space of the off-road vehicle.

20 Claims, 10 Drawing Sheets

(56) References Cited

U.S. PATENT DOCUMENTS

| | | |
|---|---|---|
| 2011/0133438 A1* | 6/2011 | Haines .................. B60R 9/048 |
| | | 280/769 |
| 2011/0208710 A1 | 8/2011 | Lesavich et al. |
| 2012/0278622 A1 | 11/2012 | Lesavich et al. |
| 2014/0189792 A1 | 7/2014 | Lesavich et al. |
| 2015/0379301 A1 | 12/2015 | Lesavich et al. |
| 2016/0321654 A1 | 11/2016 | Lesavich et al. |
| 2016/0362064 A1 | 12/2016 | Singleton |
| 2016/0368427 A1 | 12/2016 | Field, Jr. |
| 2018/0096542 A1 | 4/2018 | Mader et al. |
| 2020/0130600 A1 | 4/2020 | Morgan |

* cited by examiner

OFF-ROAD VEHICLE UTILITY RACK APPARATUS

CROSS REFERENCES TO RELATED APPLICATIONS

Not Applicable.

FIELD OF INVENTION

This application relates to off-road vehicles. More specifically, it relates to an off-road vehicle utility rack apparatus.

BACKGROUND OF THE INVENTION

Off-road vehicles are vehicles used on dirt roads, trails, forests, farms and other non-paved surfaces. Off road vehicles include All-Terrain Vehicles (ATVs) and Utility Terrain Vehicles (UTVs).

An all-terrain vehicle (ATV) is includes a motorized off-highway vehicle designed to travel on four low-pressure or non-pneumatic tires. One type of ATV includes a single seat designed to be straddled by an operator and handlebars for steering control.

ATVs with side-by-side seating are called utility terrain vehicles (UTVs) or side-by-sides to distinguish the classes of vehicle. UTVs have two or more seats and a steering wheel for steering control.

Both ATV's and UTV's typically have cargo areas on a back end of the vehicle. The cargo areas are used to store personal items, maintenance items, fuel cans, spare tires, etc.

There are several problems with off-road vehicles. One problem is that off road vehicles are used in remote areas, fuel consumption must be carefully monitored as there are no gas stations or re-fueling stations to purchase fuel. On long trips, users of off-road have to car fuel cans which are difficult to carry safely.

Another problem with off-road vehicles is that many off-road vehicles do not have a spare tire. If the off-road vehicle gets a flat tire, then the off-read vehicle may become stranded.

Another problem with off-road vehicles is that some off-road vehicles have a spare tire holder that is either attached to a back-end or a roof of the off-road vehicle. Such spare tire holders are statically attached to the off-road vehicle and interfere with access to cargo areas on the off-road vehicles.

There have been some attempts to solve some of the problems associated with off-road vehicles.

For example, U.S. Pat. No. 7,293,681, that issued to Wills teaches "A rack designed to provide convenient storage of doors optionally removable from "JEEP" style Sport Utility Vehicles. This allows a driver to operate the vehicle with the doors removed and thus free up interior space. The rack is mounted on the rear of the vehicle exteriorly of the rear-mounted spare tire. Mounted securely in the rack, the doors are spaced from the spare tire and are prevented from rubbing each other and the spare tire. The doors are therefore protected from scratches and abrasions."

U.S. Pat. No. 9,623,807, that issued to Singleton teaches A carrying system for a SUV hardtop, which includes a carrier that allows the hardtop and doors to be detached from the vehicle but still kept with the vehicle while removed. The carrying system allows for easy attachment and securing of the hardtop and doors to the carrier. In some exemplary embodiments, the carrier attaches to the hitch and to the rear-mounted spare tire carrier of the SUV. In other exemplary embodiments, the carrier attaches to the vehicle only at the hitch. Conveying the doors and hardtop with the SUV allows the SUV, at any time and in any place, to be converted quickly between convertible and non-convertible modes, depending on weather conditions and other factors."

U.S. Published Patent Application number US2020/0130600, published by Morgan, et al. teaches "A cargo and storage rack for increasing the carrying capacity of a vehicle having a spare tire mount on the exterior of the vehicle. Retaining features of a mounting boss engage the detainment features of the spare tire to the spare tire mount. The mounting boss is adapted to receive storage brackets above or below or both of above and below the mounting boss, to secure cargo securing features at desired distances of engagement from the boss. Rails of any bracket secured to the boss provide support for alternately translating and selectably locatable cargo supporting features, such that the rack can secure cargo without a bracket that provides its own securing features. Optionally, the rack can support cargo with any combination of selectably locatable cargo supporting features on the rails and a bracket, and the rack comprises methods of construction and customization that facilitate rapid reconstruction of the rack and removal from the vehicle."

U.S. Published Patent Application number US2011/0133438, published by Haines teaches "A rack for an all-terrain vehicle is disclosed. The rack is attached to the roll cage of the all-terrain vehicle as well a frame of the all-terrain vehicle. In particular, the rack may have one or more parts that permit movement of the rack to mitigate failure as the all-terrain vehicle traverses over uneven terrain."

However, these solutions still do not solve all of the problems associated with off-road vehicles. Thus, it is desirable to solve some of the problems associated with off-road vehicles.

SUMMARY OF THE INVENTION

In accordance with preferred embodiments of the present invention, some of the problems associated with off-road vehicles are overcome. An off-road utility rack apparatus is presented.

The off-road vehicle utility rack apparatus allows a spare tire to be attached to a top surface and a fuel container or other container (e.g., water, tool, suitcase, etc.) to be stored on a bottom surface of the off-road vehicle utility rack apparatus. The off-road vehicle utility rack apparatus attaches directly to integral structural components of the off-road vehicle (e.g., ATV, UTV, etc.) does not interfere with items (e.g., tool box, suitcase, etc.) stored in integral storage space on the off-road vehicle. The off-road vehicle utility rack apparatus is dynamically lifted in an up and down direction to allow easy access to the fuel container and/or the items stored in the integral storage space of the off-road vehicle.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS

Exemplary Off-Road Vehicle Utility Rack Apparatus

Figure 1:
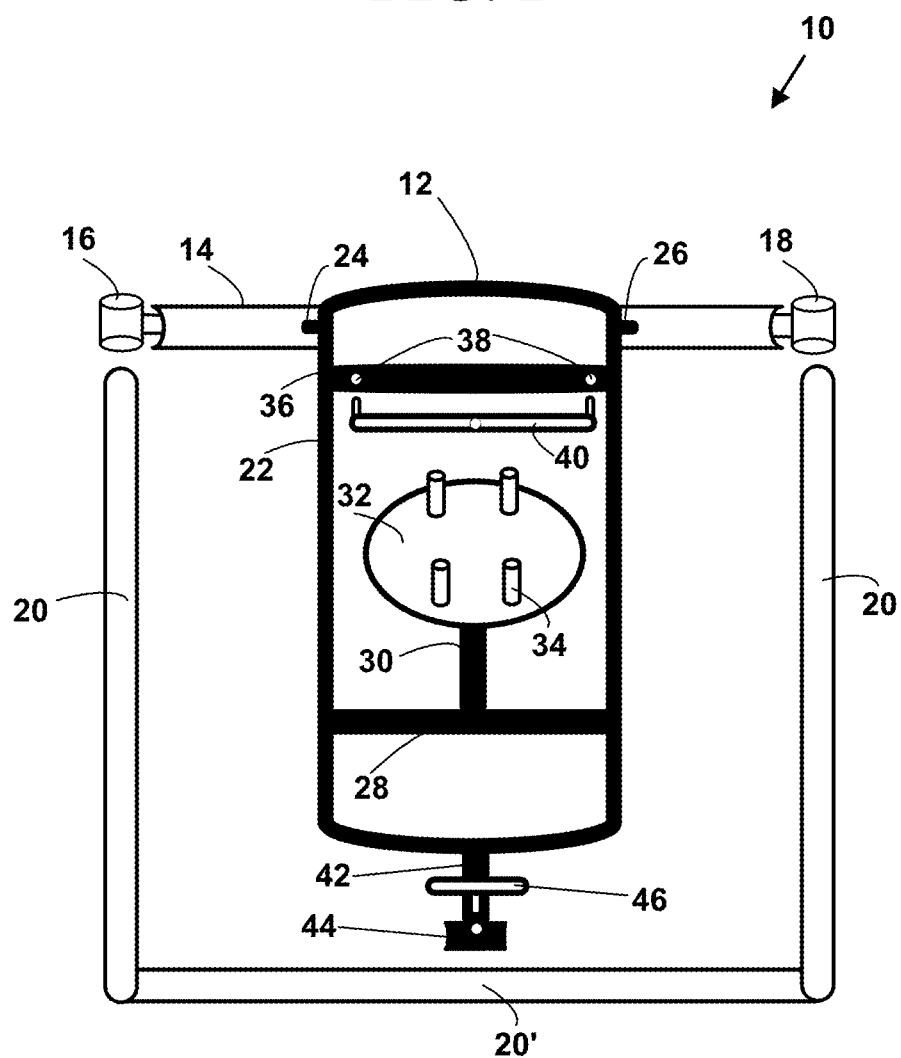
FIG. 1 is a block diagram illustrating a front view of an exemplary off-road vehicle utility rack apparatus.

FIG. 1 is a block diagram 10 illustrating a front view of an exemplary off-road vehicle utility rack apparatus 12.

The off-road vehicle utility rack apparatus 12 includes, but is not limited to, a horizontal component 14 with a first receptacle 16 at a first end and a second receptacle 18 at a second end for connecting the horizontal component 14 to an existing vertical structural component 20 (e.g., roll bar, other vehicle structural component, etc.) of an off-road vehicle.

In one embodiment, the off-road vehicle includes, but is not limited to, All-Terrain Vehicles (ATVs) 174 (FIG. 8) Utility Terrain/Task Vehicles (UTVs) 124 (FIG. 10) Off-Highway Vehicles (OHV), motorcycles, tri-cycles motor-cycles and/or other types vehicles used off-road. However, the present invention is not limited to such vehicles and/or other vehicles can be used to practice the invention.

ATV stands for "all-terrain vehicle." Typically, an ATV is used for recreation. Designed for single riders, the most common ATVs are four-wheelers/quads. A UTV is a "utility task/terrain vehicle." Designed with a cabin for two to four riders, a UTV is used for work or recreation. Alternative UTV names are "SxS" and/or "side-by-side." An Off Highway Vehicle (OHV) is a type of vehicle designed specifically for off-road use.

In one embodiment, the horizontal component 14, includes a round and/or oval and/or other shape component. However, the present invention is not limited to such embodiments and other embodiments can be used to practice the invention In one embodiment, the first receptacle 16 and the second receptacle 18 include curved two-piece brackets connected with connection means, including, but not limited to, bolts, bolt and nut combinations, nut, bolt and lock washer, rivets, rods, pins, and/or other attachment means. The curve of the brackets allows the brackets to be connected to round vertical structural components 20 of the off-road vehicle. However, the present invention is not limited to such an embodiment and other embodiments can be used to practice the invention.

The off-road vehicle utility rack apparatus 12 further includes a body component 22 with a first pivot connection component 24 and a second pivot connection component 26 allowing the apparatus 12 to be lifted in an upward direction and off the structural component 20 of the off-road vehicle and rotated around the horizontal component 24 in a semi-circular motion.

In another embodiment, the body component 22 includes a rectangle, square, polygon and/or other shaped body component.

In one embodiment, the body component 22 includes a flat and/or hollow tubular and/or square and/or solid square round, and/or oval shaped material. However, the present invention is not limited to such embodiments and other embodiments and other shapes can be used to practice the invention.

Figure 10:
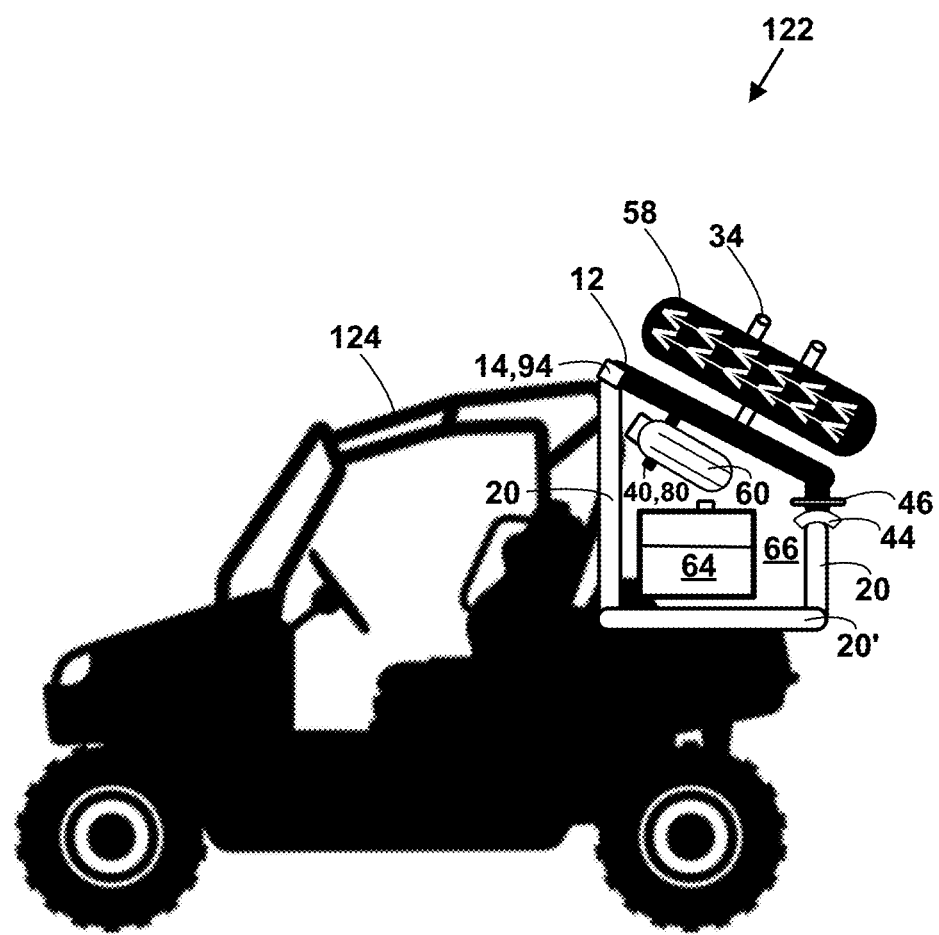
FIG. 10 is a block diagram illustrating a side view of a utility terrain vehicle (UTV) with exemplary off-road vehicle utility rack apparatus in a closed configuration.

The apparatus 12 further includes a first horizontal body component 28 at a first pre-determined location within the body component 22 connected to a first and second inner surface of the body component 22. The first horizontal body component 28 includes a first vertical connection component 30 connected at a first end to the first horizontal body component 28 and at a second end to a circular and/or oval component 32 for storing a spare tire 58 (FIG. 4) for the off-road vehicle 74 (FIG. 7), 124 (FIG. 10).

In one embodiment, the first pre-determined location is at a first pre-determined location closer to a bottom end of a top portion of the body component 22. The first pre-determined location allows for storage of items connected to a bottom portion of the body component 22. However, the present invention is not limited to such an embodiment and other embodiments and other pre-determined locations can be used to practice the invention.

The circular and/or oval component 32 includes one or more circular and/or oval protruding components 34 (four of which are illustrated for simplicity) for engaging plural receptacles in a rim of the spare tire 58 to attach the spare tire 58 to a top surface of the body component 22. However, the present invention is not limited to such an embodiment and other embodiments and other number (1, 2, 3, 5, etc.) protruding components 34 can be used to practice the invention.

In one embodiment, the protruding circular and/or oval protruding components 34 are threaded components for engaging a threaded nut (e.g., a lug nut etc.) for holding the spare tire 58 in place. In one embodiment, the one or more circular and/or oval protruding components 34 are threaded only at a protruding end portion. In another embodiment, the one or more circular and/or oval protruding components 34 are threaded along a full length of the one or more circular and/or oval protruding components 34. However, the present invention is not limited to such an embodiment and other embodiments and other pre-determined locations can be used to practice the invention.

In another embodiment, the one or more circular and/or oval protruding components 34 are threaded and attachable and/or removable from the one or more receptacles 35 (FIG. 2) in the circular and/or oval component 32. In such an embodiment, the one or more circular and/or oval protruding components 34 can be removed from the circular and/or oval component 32 to allow circular and/or oval component 32 to be used to attach and store other items other than a spare tire 58 (e.g., another fuel container/can 60 (FIG. 4), water container, tool box, suitcase, etc.). However, the present invention is not limited to such an embodiment and other embodiments and other pre-determined locations can be used to practice the invention.

In one embodiment, the apparatus 12 is adapted to be used with snow machines and/or other tracked vehicles, boats, personal water craft, other marine vehicles and/or other types of vehicles. For snow machines and tracked vehicles, the circular and/or oval component 32 is used to store tracks and/or other spare vehicle parts. For boats, personal water craft and other types of marine vehicles, the circular and/or oval component 32 is used to store fuel containers, other types of containers, and/or spare vehicle parts. However, the present invention is not limited to such an embodiment and other embodiments can be used to practice the invention The off-road vehicle utility rack apparatus 12 further includes a second horizontal body component 36 at a second pre-determined location connected to a bottom surface of the body component 22. The second horizontal body component 36 includes one or more receptacles 38 (two of which are illustrated for simplicity) for engaging a first clamping component 40 to connect a fuel container 60 and/or other storage container (e.g., water, tools, suitcase, etc.) to the bottom surface of the apparatus 12. However, the present invention is not limited to such an embodiment and other embodiments can be used to practice the invention.

In one embodiment, the first clamping component 40 includes a screw clamping component and/or a spring-handle clamping component and/or other type of clamping component. However, the present invention is not limited to such an embodiment and other embodiments can be used to practice the invention.

In one embodiment, the first clamping component 40 comprising a screw clamping component and includes a grasping component (e.g., a handle, etc.) with one or more threaded rods to engage the one or more receptacles 38 on the second horizontal body component 36. However, the present invention is not limited to such an embodiment and other embodiments can be used to practice the invention.

In one embodiment, the first clamping component 40 comprises a spring handle component and includes a hollow rod with a spring connected at a first end to a grasping component (e.g., a handle, etc.) and at a second end to a connection pin. When the spring handle component is pulled in an upward motion with pressure, the spring is compressed lifting the connection pin in the hollow rod. When the pressure on the connection component is released, the spring is uncompressed and the connection pin in the hollow rod is extended again.

The second pre-determined location allows for storage of items connected to a bottom portion of the body component 22 and is specifically selected to prevent the storage of any items on the bottom side of the body component 22 from interfering with storage items 64 (FIG. 5) in integral storage area 66 on the off-road vehicle 72.

The off-road vehicle utility rack apparatus 12 further includes a second vertical connection component 42 of a pre-determined length connected at a first end at a first pre-determined angle 43 (FIG. 3) to a bottom end of the body component 22 and connected at a second end to a connection component 42 with a second clamping component 44 to connect the apparatus 12 to a lower horizontal portion structural component 20' of the off-road vehicle.

The a second vertical connection component 42 includes the pre-determined length and the pre-determined angle 43 to allow the apparatus 12 to hold a spare tire 58 on a top surface, a fuel and/or water and/or other container 60 on a bottom surface and still allow room for other storage containers in integral storage area 66 (FIG. 5) of varying sizes of off-road vehicles 74, 122 and/or for different types and/or models of off-road vehicles 74, 122.

For example, in one embodiment, the second vertical connection component 42 includes a static pre-determined length of about twelve inches (about 30.48 centimeters (cm)) for an ATV and smaller storage items. In another embodiment the a second vertical connection component 42 may include a pre-determined length of about twenty-four inches (about 60.96 cm) for an UTV and larger storage items in the integral storage area. However, the present invention is not limited to such an embodiment and other embodiments and other pre-determined lengths can be used to practice the invention.

In one embodiment, the pre-determined angle 43 allows the off-road vehicle utility rack apparatus 12 to match a pre-determined angle (e.g., about fifteen degrees to about sixty degrees, etc.) of the vertical structural components 20 on the off-road vehicle 72 and still connect to a horizontal component 20' of the off-road vehicle 72. However, the present invention is not limited to such an embodiment and other embodiments and other pre-determined angles can be used to practice the invention.

In one embodiment, the embodiment the second vertical connection component 42 includes, but is not limited to, a telescoping and/or ball plunger structural component and/or other type of second vertical structural component 42. The second vertical connection component 42 including the telescoping component or ball plunger component allows a length of the second vertical connection component 42 to be dynamically adjusted. However, the present invention is not limited to such an embodiment and other embodiments and embodiments can be used to practice the invention.

In one embodiment, the second vertical connection component 42 includes a telescoping component that can be dynamically adjusted to plural different lengths. In such an embodiment, a smaller telescoping leg components fits inside a larger telescoping leg components. In such an embodiment, the telescoping leg further includes a locking component to securely lock the telescoping leg components at a desired height. However the present invention is not limited to such embodiments, and other embodiments can be used to practice the invention.

In another embodiment, the second vertical connection component 42 includes telescopic components with a "ball plunger" component. A "ball plunger" is a type of spring loaded device that's characterized by the use a ball component included on a telescoping leg component used within a telescoping leg component with plural circular receptacle components to engage the ball component at multiple pre-determined heights. When pressure is applied, the ball sinks, compressing the enclosed spring and telescoping leg component is moved up and down in the telescoping leg components to align it at a desired circular receptacle component. When pressure is removed, the compressive forces of the spring push the ball back up to its original position locking the two telescoping leg component securely into positon at a desired height. However the present invention is not limited to such embodiments, and other embodiments can be used to practice the invention.

In one embodiment, second vertical connection component 42 includes a pre-determined angle 43 to connect the apparatus 12 to a lower horizontal portion structural component 20' of the off-road vehicle 72. However the present invention is not limited to such embodiments, and other embodiments can be used to practice the invention.

In one embodiment, the second clamping component 46 includes a screw clamping component and/or a spring-handle clamping component and/or other type of clamping component. However, the present invention is not limited to such an embodiment and other embodiments can be used to practice the invention.

Figure 2:
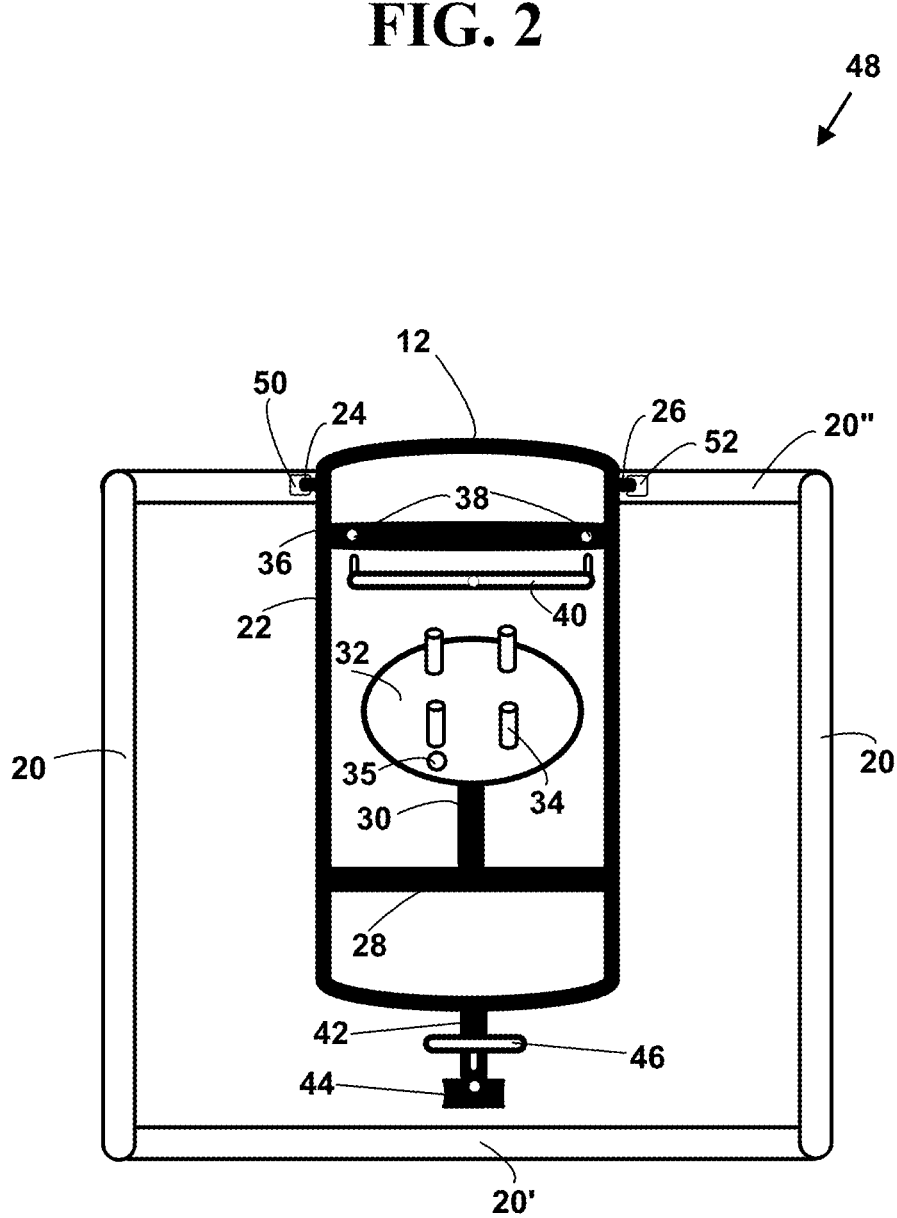
FIG. 2 is a block diagram illustrating a front view of another exemplary off-road vehicle utility rack apparatus.

FIG. 2 is a block diagram 48 illustrating a front view of another exemplary off-road vehicle utility rack apparatus 12.

In the embodiment illustrated in FIG. 2, the off-road vehicle utility rack apparatus 12 includes does not include the horizontal component 14 for connecting the apparatus to an existing vertical structural component 20 (e.g., roll bar, other vehicle structural component, etc.) of an off-road vehicle.

In the embodiment illustrated in FIG. 2, the off-road vehicle utility rack apparatus 12 further includes a first pivot connection component 24 with a first connection bracket 50 and a second pivot connection component 26 with second connection bracket 52 to be connection directly to an existing horizontal structural component 20" of the off-road vehicle allowing the apparatus 12 to be lifted in an upward direction and off a structural component 20 of the off-road vehicle 72.

In one embodiment, the first connection bracket 50 and the second connection bracket 52 includes, but is not limited to an eye bracket. An eye bracket includes, but is not limited to, includes a shackle or other connector with round and/or oval receptacles for receiving a pin, rivet, bolt nut and bolt, nut and bolt and lock washer, and/or other fasteners and that may be used for attaching the apparatus 12 to a structural components 20" of the off-road vehicle 72.

Figure 3:
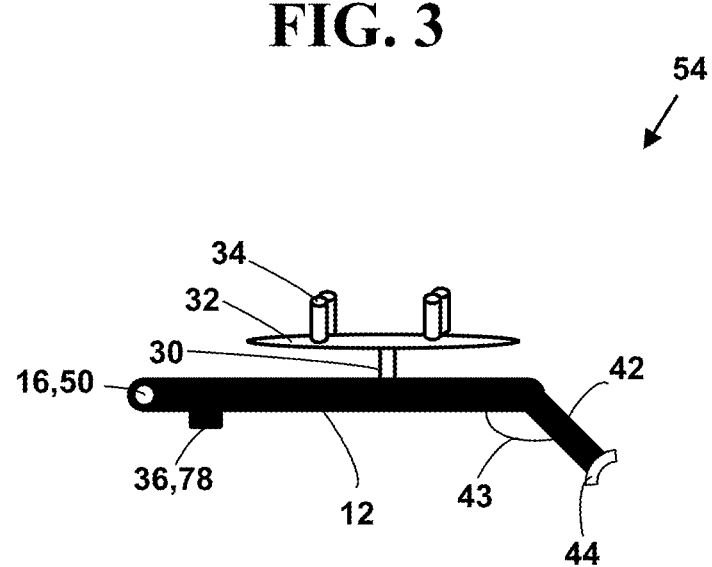
FIG. 3 is a block diagram illustrating a side view of an exemplary off-road vehicle utility rack apparatus.

FIG. 3 is a block diagram illustrating a side view 54 of an exemplary off-road vehicle utility rack apparatus 12.

The apparatus 12 in FIG. 3 does not include the spare tire 58 or the fuel container 60.

Figure 4:
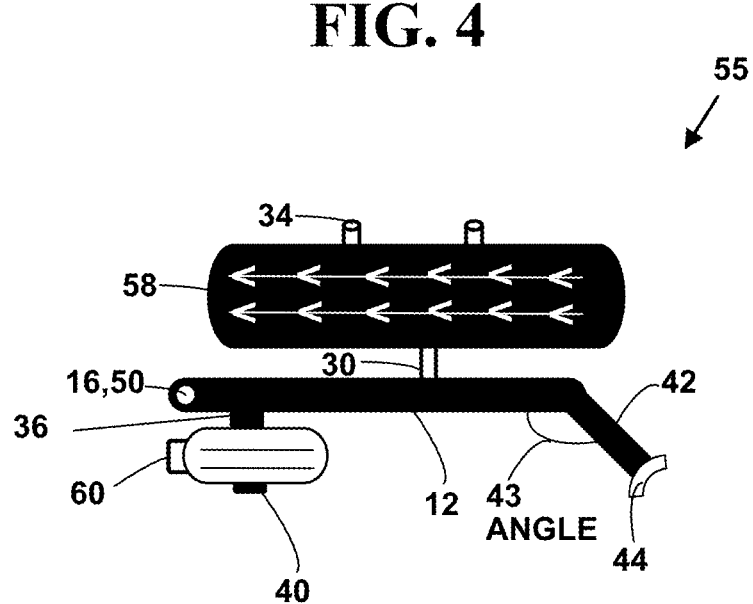
FIG. 4 is a block diagram illustrating a side view of an exemplary off-road vehicle utility rack apparatus with a spare tire attached.

FIG. 4 is a block diagram 56 illustrating a side view of an exemplary off-road vehicle utility rack apparatus 12 with a spare tire attached 58 and fuel container 60 attached.

Figure 5:
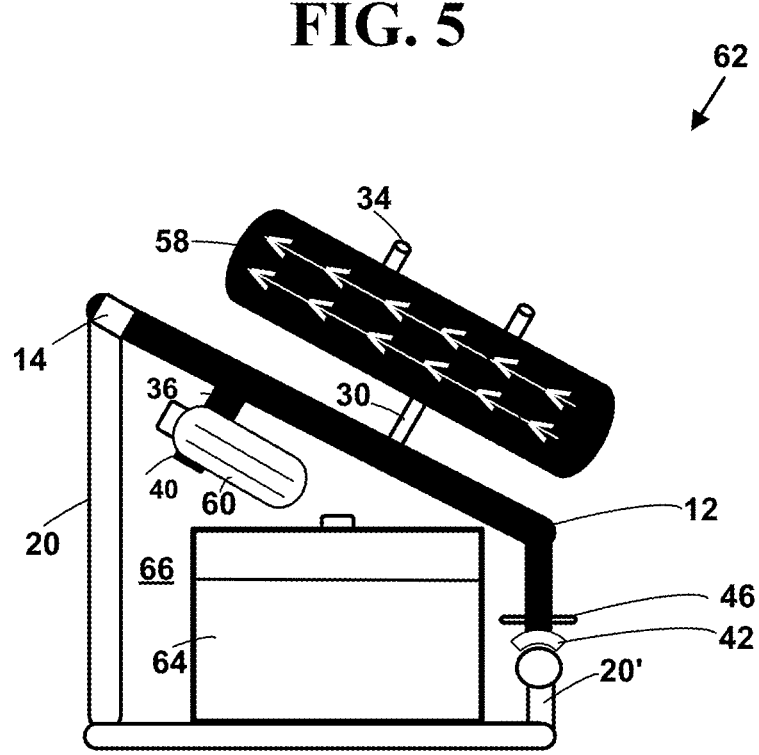
FIG. 5 is a block diagram illustrating a side view of an exemplary off-road vehicle utility rack apparatus with a spare tire and a fuel can attached in a closed configuration.

FIG. 5 is a block diagram illustrating a side view 62 of an exemplary off-road vehicle utility rack apparatus 12 with a spare tire 58 and a fuel container 60 attached in a closed configuration.

FIG. 5 further illustrates a storage container 64 stored in integral space 66 within structural components 20, 20' of an off-road vehicle.

In one embodiment, the integral space 66 is large enough to store at least a storage container 64 that includes a sixty-five quart (61.51 liters) container (e.g., a cooler, etc.) with dimensions of at least 32.05"(L)×18.56"(W)×17.80" (H) (81.41 cm (L)×47.14 cm (W)×45.21 cm (H)). However, the present invention is not limited to such an embodiment and other measurements and specifically other larger height measurements for integral space 66 can be used to practice the invention.

In one specific embodiment, the storage container 64 includes a DEWALT 65 Qt Roto Molded Cooler, Heavy Duty Ice Chest. This type of storage container is currently one of the largest storage containers available. However, the present invention is not limited to such an embodiment and other embodiments can be used to practice the invention and other storage containers 64 (e.g., tool boxes, suitcases, etc.) of other sizes and types can be used to practice the invention.

Figure 6:
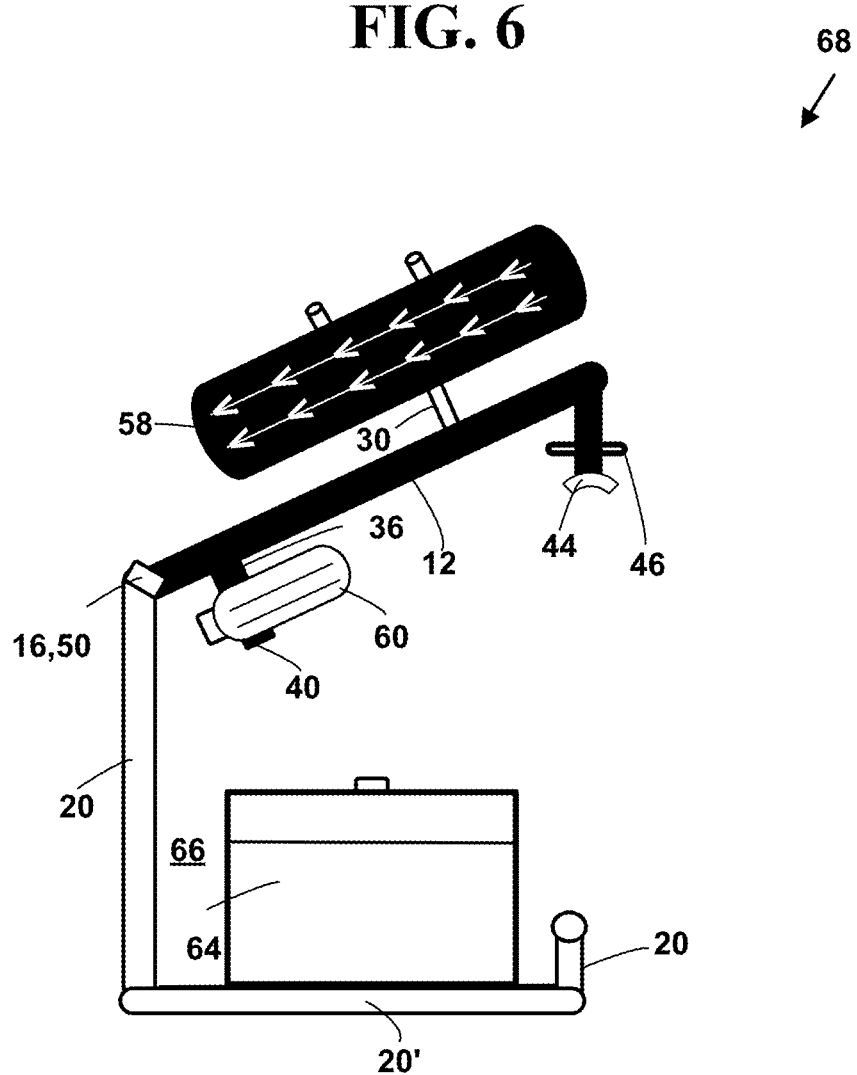
FIG. 6 is a block diagram illustrating a side view of an exemplary off-road vehicle utility rack apparatus with spare tire and fuel can attached and structure components of the off-road vehicle in an open configuration.

FIG. 6 is a block diagram 68 illustrating a side view of an exemplary off-road vehicle utility rack apparatus 12 with spare tire 58 and fuel container 60 attached and structural components 20, 20' of the off-road vehicle in an open configuration.

Figure 7:
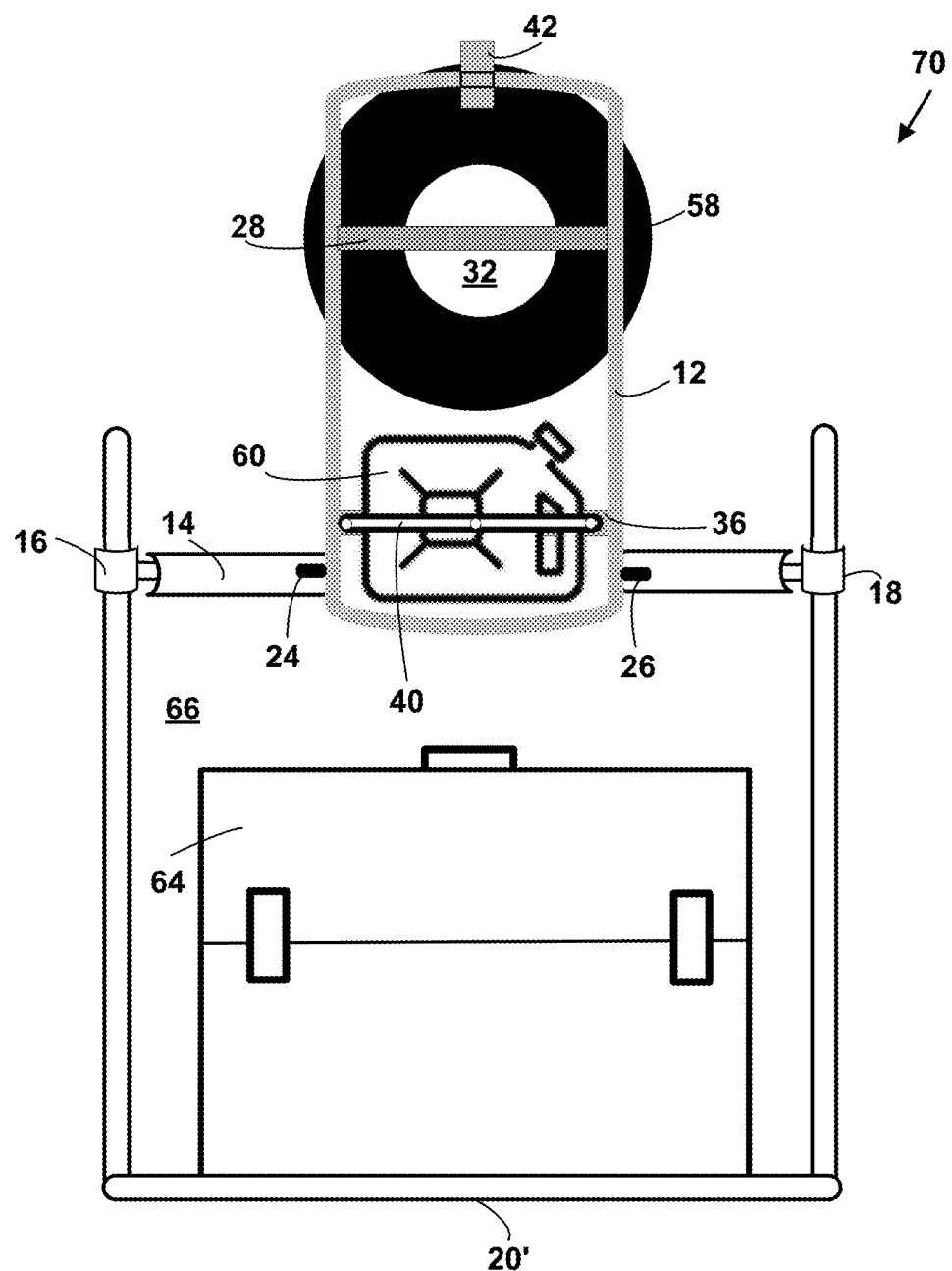
FIG. 7 is block diagram illustrating an underneath view of an exemplary off-road vehicle utility rack apparatus.

FIG. 7 is block diagram 70 illustrating an underneath view of an exemplary off-road vehicle utility rack apparatus 12.

In FIG. 7, the off-road vehicle utility rack apparatus 12 is in an opened configuration and is in a vertical position with respect to the structural components 20, 20' of the off-road vehicle.

Figure 8:
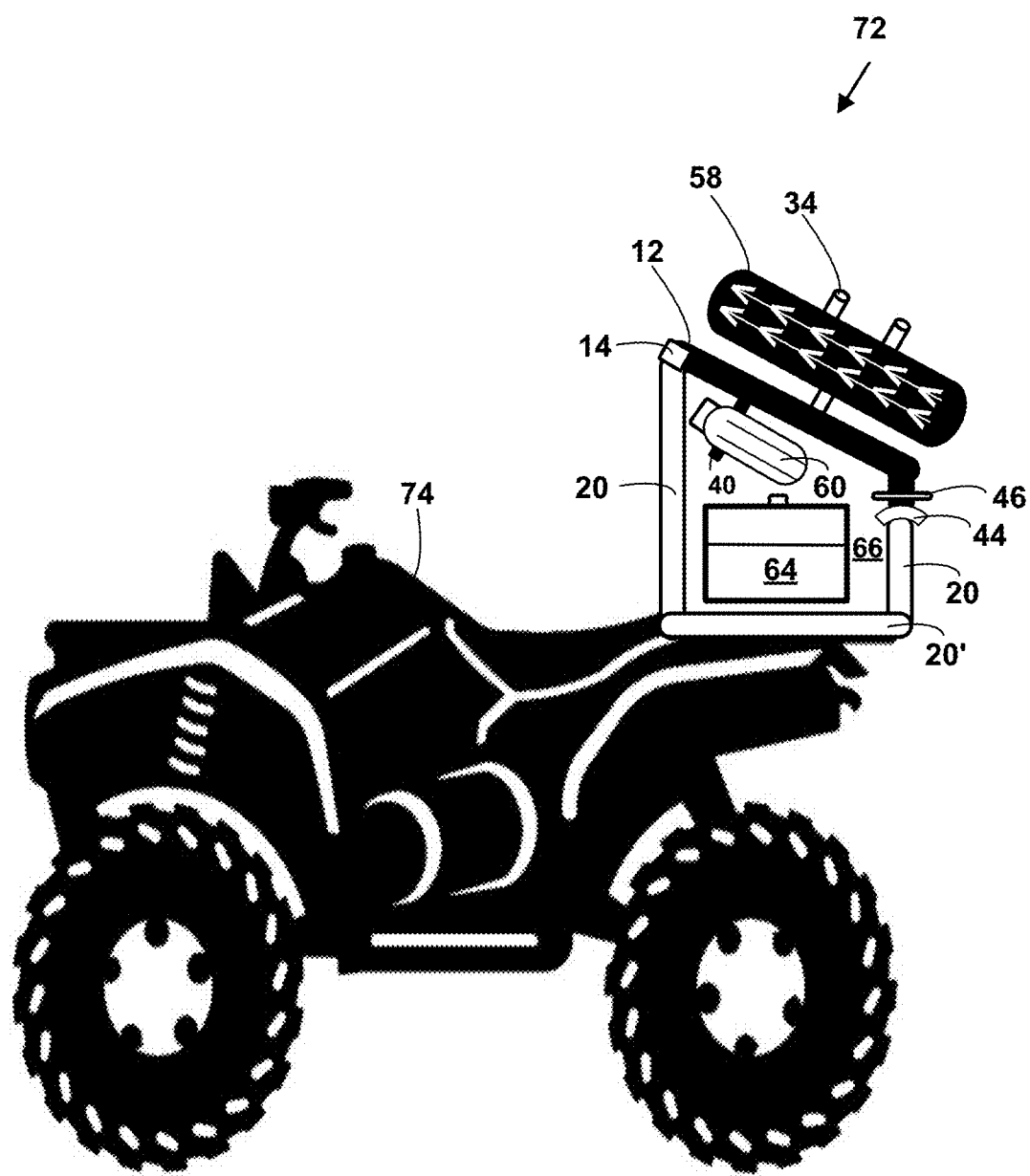
FIG. 8 is a block diagram illustrating a side view of an All-Terrain Vehicle (ATV) with exemplary off-road vehicle utility rack apparatus in a closed configuration.

FIG. 8 is a block diagram 72 illustrating a side view of an All Terrain Vehicle (ATV) 74 with exemplary off-road vehicle utility rack apparatus 12 in a closed configuration.

In FIG. 8, the ATV 74 includes a storage container 64 stored in integral storage space 66 and including a fuel container 60 connected to an bottom side of the apparatus 12 and a spare tire 58 connected to a top side of the apparatus 12.

If the ATV 74 does not include any structural components 20 (e.g., roll bar, etc.), the exemplary off-road vehicle utility rack apparatus 12, further includes all necessary structural components 20. In such an embodiment, all the necessary structural components are attached to the ATV 74 before the exemplary off-road vehicle utility rack apparatus 12 is attached. However, the present invention is not limited to such an embodiment and embodiments can be used to practice the invention.

Figure 9:
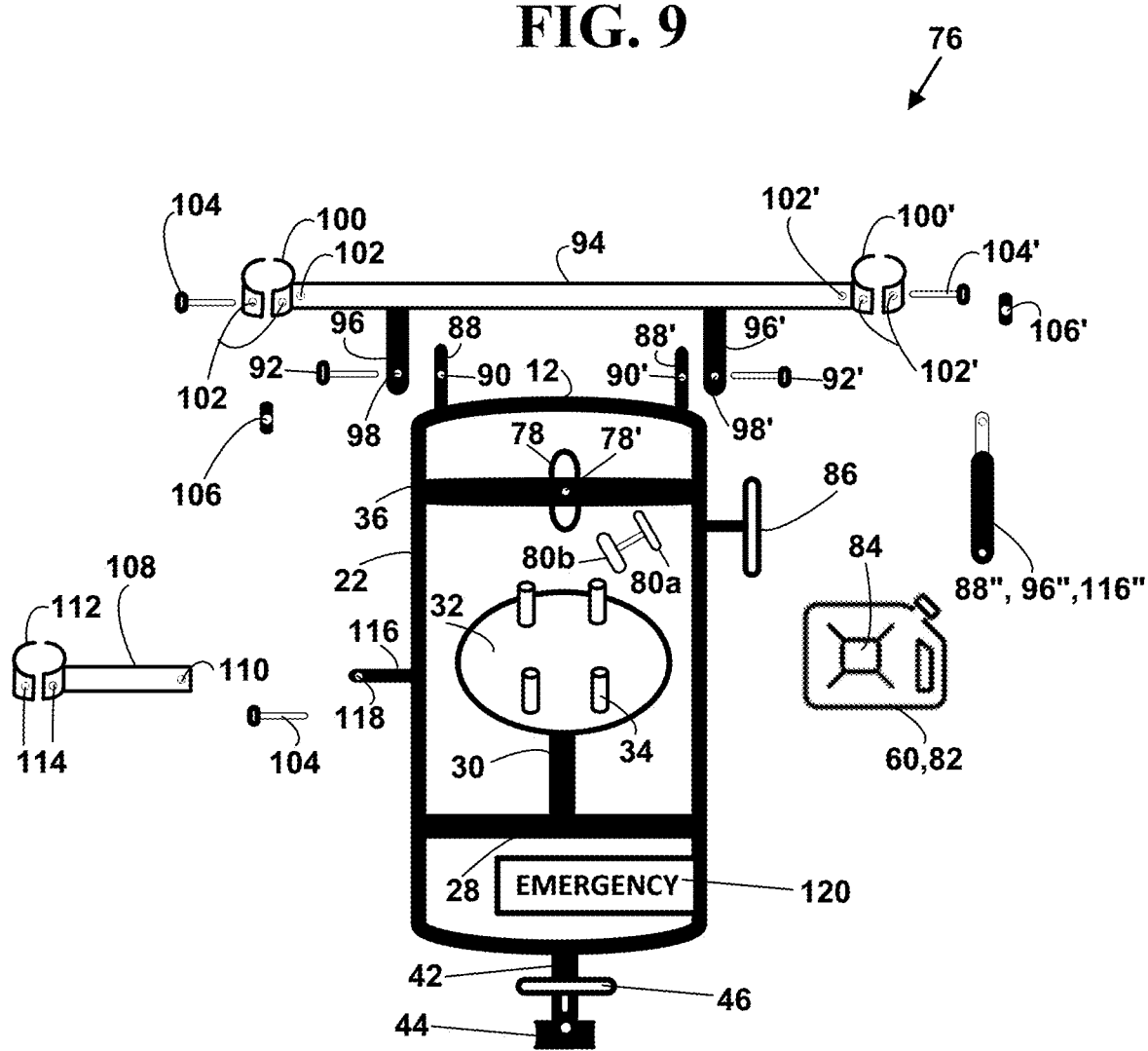
FIG. 9 is a block diagram illustrating an exploded view of an exemplary off-road vehicle utility rack apparatus.

FIG. 9 is a block diagram 76 illustrating an exploded view of an exemplary off-road vehicle utility rack apparatus 12.

FIG. 9 illustrates another configuration of the off-road vehicle utility rack apparatus 12. This embodiment includes a pack mount lock bracket 78 with a pack lock bracket receptacle 78' for engaging a pack mount lock 80 connected to the second horizontal body component 36. In this embodiment, the pack mount lock 80 is used specifically with a UTV fuel and/or water and/or other fluid (e.g., oil, etc.) container 82 with a receptacle 84 in the middle of the fuel container 82 to accept locking components from the pack mount lock 80. The pack mount lock 80 includes a circular bottom 80b portion with a threaded receptacle to engage a "T" shaped lock down handle 80a with a threaded screw portion. The "T" shaped lock down handle 80a is rotated around and down in a circular motion to engage the circular bottom 80b portion of the pack mount lock 80 through the second horizontal body component 36. The receptacle 84 in the container 82 allows the T" shaped lock down handle 80a of the pack mount lock 80 to engage the container 82 and securely hold the container 82 in place and/or allows the container 82 to be easily removed and/or replace for filling and/or use. However, the present invention is not limited to such embodiments and other embodiments can be used to practice the invention.

The first clamping component 40 (FIG. 1) is used on the apparatus 12 instead of the pack mount lock bracket 78 when a container 82 does not include a receptacle 84 (i.e., hole) in the middle of the container 82 and provides additionally flexibility for various types of containers 82.

In one specific embodiment, the pack mount lock 80 includes, but is not limited to, a pack mount lock identified by the brand name HOTINA, manufactured by Kunshan Fengteng Huhai Electronic Commerce Co., Ltd. of Kunshan Suzhou, Jiangsu, China and/or under the brand name, ROTOPAX, manufactured by RotoXPax, of Wood Cross, Utah, US. However, the present invention is not limited to such an embodiment and other embodiments and other types of pack mounts from other manufacturers may be used to practice the invention.

In one specific embodiment, the UTV fuel and/or water container 82 with a receptacle 84 in the middle of the fuel and/or water container 82, includes but is not limited to, ROTOPAX one to four gallon (3.78 liters to 15.14 liters), manufactured by RotoXPax, of Wood Cross, Utah, US. The ROTOPAX container 82 is sold in a red color for gasoline fuel, a yellow color for diesel fuel, a white color for water, a black color for oil, etc. However, the present invention is not limited to such an embodiment and/or other embodiments, other containers and/or other sized containers and/or other color containers can be used to practice the invention.

The exemplary off-road vehicle utility rack apparatus 12 further includes a locking handle component 86 to lock the apparatus 12 in an upright (i.e., open, etc.) position and/or lowered (i.e., closed, etc.) The locking handle component 86 is an additional safety feature to prevent the apparatus 12 from accidentally closing and/or opening and injuring a user. However, the present invention is not limited to such an embodiment and other embodiments can be used to practice the invention.

The exemplary off-road vehicle utility rack apparatus 12 further includes first connection components 88, 88' (two of which are illustrated for simplicity) each with a receptacle 90, 90' for accepting a connection means 92, 92' including but not limited to, a bolt, nut and bolt, nut and bolt and lock washer, pin, rivet, etc. In one embodiment, the receptacle 90, 90' include a threaded receptacle. However, the present invention is not limited to such embodiments and other embodiments with other connection means and receptacles can be used to practice the invention.

In one embodiment, the exemplary off-road vehicle utility rack apparatus 12 further includes first connection components 88, 88' including, but not limited to, a hydraulic rod and piston and/or hydraulic cylinder and rod 88" and/or hydraulic shock and/or gas rod and piston and/or gas shock and/or gas cylinder and rod 88" component.

A hydraulic cylinder and/or gas cylinder is a tube that produces linear actuation utilizing hydraulic and/or gas pressure. A pressure of a hydraulic fluid and/or gas forces a piston to move in either a pushing or pulling motion. Hydraulic and/or gas cylinders work by the principle of converting kinetic energy (i.e., movement) into thermic energy (i.e., heat). A total weight that can be pushed or lifted by a hydraulic cylinder and/or gas cylinder is equal to a pressure provided by a pump portion multiplied by a size of a cylinder rod.

A hydraulic cylinder and rod 88" includes a hydraulic actuator which creates linear movement by converting hydraulic energy back to a mechanical movement. A gas cylinder and rod 88" includes a gas actuator which creates linear movement by converting gas energy back to a mechanical movement.

For that purpose, fluid in the shock absorber is forced to flow through restricted outlets and valve systems, thus generating hydraulic resistance and creating a force with assists with lifting heavy objects. Gas shock absorbers use gases instead of fluids to generate gas resistance. The hydraulic resistance and/or gas resistance provide slow movement over defined movement positions and assist with lifting a total weight of the apparatus 12 (about fifty pounds (about 22.68 kilograms (kg)) depending on the materials (e.g., metal, wood, plastic, composite materials, etc.) used to construct the apparatus 12, with the spare tire 58 (about fifty to about sixty pounds (about 22.28 kg to about 27.22 kg) depending on tire size and rims used and the storage container 60 full of fluids (one gallon size about six to about eight pounds (about 2.72 kg to 3.62 kg), depending on the fluid type (e.g., water, gasoline, diesel fuel, oil, etc.) to make it easier for a user to lift and secure the apparatus 12 into an open position. However, the present invention is not limited to such embodiments and other embodiments can be used to practice the invention.

The exemplary off-road vehicle utility rack apparatus 12 further includes a horizontal connection bar component 94 to connect the apparatus 12 to an existing structural component 20 of an ATV 74 and/or a UTV 124.

The horizontal connection bar component 94 includes, but is not limited to a second connection component 96, 96' with a receptacle 98, 98' for accepting a connection means 92, 92'. In one embodiment, the connection component 96, 96' includes a static connection component comprising a flat and/or round and/or oval piece of metal and/or other material. In another embodiment, the connection component 96, 96' includes a dynamic connection component, including, but not limited to, a hydraulic rod and piston and/or hydraulic cylinder and rod 96" and/or hydraulic shock and/or gas rod and piston and/or gas shock and/or gas cylinder and rod 96" component.

The horizontal connection bar component 94, further includes connection clamp 100, 100'. The connection clamp 100, 100' includes a two-piece clamp. A first clamp piece is integral and permanently attached to the horizontal connection bar 94. The second clamp piece is attachable and/or removable from an existing component 20 of an ATV 74 and/or UTV 124. The connection clamp 100, 100' includes one or more receptacles 102, 102' for accepting one or more connection means 104, 104' (only one of which is illustrated for simplicity). The one or more receptacles 102, 102' included threaded and/or non-threaded receptacles and/or a combination thereof. The connections means 104, 104' include, but are not limited to, bolts, bolt and nut, nut, bolt and lock washer, combinations, pins, rivets and/or other types of connections means.

In one specific embodiment, the connection clamp 100, 100' includes a two-piece clamp for which receptacles (i.e., holes, etc.) are drilled into an existing structural component 20 of the ATV 74 and/or UTV 124 for permanent mounting.

In another specific embodiment, the connection clamp 100, 100' includes a two-piece clamp for which no receptacles are drilled into an existing structural component 20 of the ATV and/or UTV 124. In such an embodiment, the one or more receptacles 102, 102' for accepting one or more connection means 104, 104' are included on clamp connector 106, 106' which is included on a top, exterior surface of the connection clamp 100, 100'. However, the present invention is not limited to such an embodiment and other embodiments and other types of clamps can be used to practice the invention.

In one embodiment, the exemplary off-road vehicle utility rack apparatus 12 further includes an emergency locator component 120. The emergency locator component 120 is not limited to the position indicated in FIG. 9 and can be included anywhere in and/or on any component of the apparatus 12. The emergency locator component 120 includes, but not limited to, a Global Positioning System (GPS), Emergency Position Indicating Radio Beacon (EPIRBs), personal locator beacon (PLB), emergency locator beacon (ELB), and/or emergency locator transmitter (ELT) sensors and/or actuators 120. In such an embodiment, the emergency locator component 120 is used to locate the ATV 74 or UTV 124 in case of an emergency situation in a remote off-road setting. In one embodiment such emergency locators include a two-way communication component, including but not limited to a cellular telephone, and/or satellite communication component, such as ONSTAR by GENERAL MOTORS, SIRIUS XM RADIO, etc. In another embodiment, the emergency locator component 120 further includes an accelerometer component to measure the vibration, and/or acceleration or motion of a vehicle. The accelerometer component is used to determine if the ATV 74 and/or UTV 124 may have been involved in impact from an impact, roll over and/or other accident related event. However, the present invention is not limited to such an embodiment and the invention can be used with and/or without any emergency locators.

In another embodiment, the exemplary off-road vehicle utility rack apparatus 12 is used without the horizontal connection bar component 94. In such an embodiment, the exemplary off-road vehicle utility rack apparatus 12 operates by swinging up (and out on some off-road vehicles) in a circular motion in a left and right direction of the ATV 74 and/or UTV 124. In such an embodiment, the exemplary off-road vehicle utility rack apparatus 12 includes a vertical connection bar component 108, with one or more receptacles 110 (only one of which is illustrated for simplicity), connection clamp component 112, 112' with one or more receptacles 114, 114' to connect the exemplary off-road vehicle utility rack apparatus 12 to a vertical structural component 20 of the ATV 74 and/or UTV 124 with a connections means 104 (e.g., bolt, nut and bolt combination, nut, bolt and lock washer, pin, rivet, etc.).

In such an embodiment, the exemplary off-road vehicle utility rack apparatus 12 does not include first connection components 88, 88'. Instead, the exemplary off-road vehicle utility rack apparatus 12 includes one or more vertical connection components 116 (only one of which is illustrated for simplicity) with one or more receptacles 118. The one or more vertical connection component 116 further include, but are not limited to, a hydraulic rod and piston and/or hydraulic cylinder and rod 116" and/or hydraulic shock and/or gas rod and piston and/or gas shock and/or gas cylinder and rod 116" component. The hydraulic resistance and/or gas resistance provides movement over defined movement positions to make is easier for a user to lift and secure the apparatus 12.

In one specific embodiment, the receptacles 35, 38, 90, 90', 98, 98', 102, 102', 106, 106', 110, 114 include threaded and/or non-threaded receptacles for accepting a one-half inch (1.27 centimeters) bolt and nut combination and/or bolt and/or alien head/hex key bolt and/or bolt and nut combinations, nut, bolt and lock washer combination, etc. The horizontal connection bar component 94 includes a length of about forty-six inches (116.84 cm) not including the connection clamp 100, 100'. The connection clamp 100, 100' includes about a two inch (5.08 cm) length, two piece connection clamp. The body component 22 includes about a length of thirty-four and one half inches (87.63 cm) and about a width of nine and one half inches (24.13 cm) comprising ten gage, one and about one half inch (3.81 cm) steel tubing. In such an embodiment, such specific measurements are included, but not limited to, specifically for a specific type of UTV including, but not limited to, a HONDA side-by-side UTV vehicle. In other embodiments, other identical and/or similar measurements are included specifically for, but not limited to, CAM-AN, CUB CADET, JOHN, DEER, CASE, ARTIC CAT, and/or other types and models of side-by-side UTV vehicles. However, the present invention is not limited to such an embodiment and other embodiments with other size receptacles can be used to practice the invention.

FIG. 10 is a block diagram 122 illustrating a side view of a utility terrain vehicle (UTV) 124 with exemplary off-road vehicle utility rack apparatus 12 in a closed configuration.

If the ATV 74 and/or UTV 124 does not include any structural components 20, the exemplary off-road vehicle utility rack apparatus 12, further includes all necessary structural components 20. In such an embodiment, all the necessary structural components are attached to the ATV 74 and/or UTV 124 before the exemplary off-road vehicle utility rack apparatus 12 is attached. However, the present invention is not limited to such an embodiment and embodiments can be used to practice the invention.

In one embodiment, the components of the off-road vehicle utility rack apparatus 12, include, but are not limited to, a metal, plastic, wood, rubber and/or composite material components, and/or combinations thereof. However, the present invention is not limited to such embodiments and other embodiments and other shapes can be used to practice the invention.

Components of the components of the off-road vehicle utility rack apparatus 12 are manufactured with blow molding, wood fabrication, injection molding, metal fabrication (stainless steel, brass, aluminum, brass, steel, iron, etc.) composite material creation, 3D printing, extrusion molding/forming, rotational molding, pultrusion forming, thermo forming, vacuum forming, metal stamping, pullwinding, hand-making and/or combinations thereof, etc. However, the present invention is not limited to these manufacturing processes and more, fewer and/or other types of manufacturing processes can be used to practice or produce the invention.

It should be understood that the architecture, programs, processes, methods and systems described herein are not related or limited to any particular type of materials unless indicated otherwise. Various types of general purpose or specialized materials may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

Therefore, all embodiments that come within the scope and spirit of the preceding detailed description and equivalents thereto are claimed as the invention.

I claim:

1. An off-road vehicle utility rack apparatus, comprising in combination:
a horizontal component with a first receptacle at a first end and a second receptacle at a second end for connecting the horizontal component to an existing vertical structural component of an off-road vehicle;
a body component with a first pivot connection component and a second pivot connection component connected to the horizontal component allowing the off-road vehicle utility rack apparatus to be lifted in an upward direction and off the structural component of the off-road vehicle and rotated around the horizontal component in a semi-circular motion,
the first pivot connection component and the second pivot connection component including an eve bracket component;
a first horizontal body component connected at a first pre-determined location within the body component and connected to a first inner surface and a second inner surface of the body component at the first pre-determined location;

the first horizontal body component including a first vertical connection component connected at a first end to the first horizontal body component and at a second end to a circular component for storing a spare tire for the off-road vehicle on a top portion of the body component, the circular component including one or more protruding components for engaging one or more receptacles in a rim of the spare tire to attach the spare tire to a top surface of the circular component;

a second horizontal body component connected at a second pre-determined location on a bottom surface of the body component, the second horizontal body component including one or more receptacles for engaging a first clamping component to connect a storage container to the bottom portion of the body component, the second pre-determined location allowing for storage of items connected to the bottom portion of the body component and the pre-determined location specifically selected to prevent storage of any storage container on the bottom side of the body component from interfering with any storage items in an integral storage area on the off-road vehicle; and a second vertical connection component of a pre-determined length connected at a first end at a pre-determined angle to a bottom end of the body component and connected at a second end to a connection component with a second clamping component, to securely connect the off-road vehicle utility rack apparatus to a lower horizontal portion structural component of the off-road vehicle, the pre-determined length and the pre-determined angle allowing the off-road vehicle utility rack apparatus to hold the spare tire on the top surface of the body component, the storage container on the bottom surface of the body component and allowing room for other storage items in the integral storage area of the off-road vehicle without interfering with any storage items in the integral storage area on the off-road vehicle.

2. The off-road vehicle utility rack apparatus of claim 1, wherein the off-road vehicle includes, All-Terrain Vehicles (ATVs), Utility Terrain Vehicles (UTVs), Off Highway Vehicles (OHV), motorcycles, tri-cycle motorcycles, snow machines or other tracked vehicles.

3. The off-road vehicle utility rack apparatus of claim 1, further comprising a different pre-determined angle and a different pre-determined length providing a different integral storage space of a different pre-determined size for other different types of storage containers of different varying sizes for different types and models of off-road vehicles.

4. The off-road vehicle utility rack apparatus of claim 1, wherein the pre-determined angle includes an angle of fifteen to sixty degrees.

5. The off-road vehicle utility rack apparatus of claim 1, further including a dynamically adjustable second vertical connection component dynamically adjustable to a new pre-determined length.

6. The off-road vehicle utility rack apparatus of claim 1, further including a Global Positioning System (GPS), Emergency Position Indicating Radio Beacon (EPIRBs), personal locator beacon (PLB), emergency locator beacon (ELB), emergency locator transmitter (ELT) sensors or actuators or an accelerometer component.

7. The off-road vehicle utility rack apparatus of claim 1, wherein the vertical structural component of the off-road vehicle includes a roll bar or other protection component.

8. The off-road vehicle utility rack apparatus of claim 1, wherein body component includes a hollow or solid tubular body component for a flat body component.

9. The off-road vehicle utility rack apparatus of claim 1, wherein body component includes a square, rectangle or polygon shape.

10. The off-road vehicle utility rack apparatus of claim 1, wherein the one or more protruding components for engaging one or more receptacles in a rim of the spare tire include threads along a full length or only a selected portion of the one or more receptacles for engaged a threaded nut.

11. The off-road vehicle utility rack apparatus of claim 1, wherein the one or more protruding components for engaging one or more receptacles in a rim of the spare tire include threads and are attachable to and removable from the circular component allowing the circular component to be used to attach and remove other items other than the spare tire for the off-road vehicle.

12. The off-road vehicle utility rack apparatus of claim 1, wherein the circular component with the one or more protruding components removed is used to store tracks for tracked vehicles including snow machines and other tracked vehicles.

13. The off-road vehicle utility rack apparatus of claim 1, wherein the storage containers include fuel containers, water containers, tool boxes, suitcases or other storage containers.

14. The off-road vehicle utility rack apparatus of claim 1, wherein the pre-determined angle allows off-road vehicle utility rack apparatus to be connected to existing structural elements of varying types and for different types of off-road vehicles.

15. The off-road vehicle utility rack apparatus of claim 1, wherein components of the off-road vehicle utility rack apparatus include metal, plastic, wood, rubber, composite material components, or combinations thereof.

16. The off-road vehicle utility rack apparatus of claim 1, wherein components of the off-road vehicle utility rack apparatus are manufactured with blow molding, wood fabrication, injection molding, metal fabrication, composite material creation, 3D printing, extrusion molding, extrusion forming, rotational molding, pultrusion forming, thermo forming, vacuum forming, metal stamped, pullwinding, hand-making, or combinations thereof.

17. An off-road vehicle utility rack apparatus, comprising in combination:

a horizontal component with a first receptacle at a first end and a second receptacle at a second end for connecting the horizontal component to an existing vertical structural component of an off-road vehicle;

a body component with a first pivot connection component and a second pivot connection component for connecting the off-road utility rack apparatus to the horizontal structural component, the first pivot and second pivot connection allowing the off-road vehicle utility rack apparatus to be lifted in an upward direction and off the structural component of the off-road vehicle and rotated around the horizontal component in a semi-circular motion, the first pivot connection component and the second pivot connection component further including an eye bracket component, the first pivot connection and the second pivot connection further including a hydraulic cylinder and rod or gas cylinder and rod, providing movement over defined movement positions to make it mechanically easier to lift a total weight for the off-road utility rack apparatus including a spare tire and a storage container filled with a liquid, to move and secure the off-road utility rack apparatus into an open position;

a first horizontal body component connected at a first pre-determined location within the body component and connected to a first inner surface and a second inner surface of the body component at the first pre-determined location;

the first horizontal body component including a first vertical connection component connected at a first end to the first horizontal body component and at a second end to a circular component for storing the spare tire for the off-road vehicle on a top portion of the body component, the circular component including one or more protruding components for engaging one or more receptacles in a rim of the spare tire to attach the spare tire to a top surface of the circular component;

a second horizontal body component connected at a second pre-determined location on a bottom surface of the body component, the second horizontal body component including one or more receptacles for engaging a first clamping component to connect the storage container with a receptacle completely through a middle portion of the storage container to the bottom portion of the body component via the first clamping component and the receptacle completely through the middle portion of the storage container, the second pre-determined location allowing for storage of items connected to the bottom portion of the body component and the pre-determined location specifically selected to prevent storage of any storage container on the bottom side of the body component from interfering with any storage items in integral storage area on the off-road vehicle;

a second vertical connection component of a pre-determined length connected at a first end at a pre-determined angle to a bottom end of the body component and connected at a second end to a connection component with a second clamping component, to securely connect the off-road vehicle utility rack apparatus to a lower horizontal portion structural component of the off-road vehicle, the pre-determined length and the pre-determined angle allowing the off-road vehicle utility rack apparatus to hold the spare tire on the top surface of the body component, the storage container on the bottom surface of the body component and allowing room for other storage items in the integral storage area of the off-road vehicle without interfering with any storage items in integral storage area on the off-road vehicle; and a locking handle component on the body component to prevent the off-road vehicle utility rack apparatus from accidently closing and/or opening and injuring a user.

18. An off-road vehicle utility rack apparatus, comprising in combination:

a horizontal component with a first receptacle at a first end and a second receptacle at a second end for connecting the horizontal component to an existing vertical structural component of an off-road vehicle, the first receptacle and the second receptacle including curved two-piece brackets connected together with connection means, including, bolts, nut and bolts, nut and bolts and lock washers, rivets, pins, or combinations thereof, and connected to the existing vertical structural component of the off-road vehicle;

a body component with a first pivot connection component and a second pivot connection component connected to the horizontal component allowing the off-road vehicle utility rack apparatus to be lifted in an upward direction and off the structural component of the off-road vehicle and rotated around the horizontal component in a semi-circular motion;

a first horizontal body component connected at a first pre-determined location within the body component and connected to a first inner surface and a second inner surface of the body component at the first pre-determined location;

the first horizontal body component including a first vertical connection component connected at a first end to the first horizontal body component and at a second end to a circular component for storing a spare tire for the off-road vehicle on a top portion of the body component, the circular component including one or more protruding components for engaging one or more receptacles in a rim of the spare tire to attach the spare tire to a top surface of the circular component;

a second horizontal body component connected at a second pre-determined location on a bottom surface of the body component, the second horizontal body component including one or more receptacles for engaging a first clamping component to connect a storage container to the bottom portion of the body component, the second pre-determined location allowing for storage of items connected to the bottom portion of the body component and the pre-determined location specifically selected to prevent storage of any storage container on the bottom side of the body component from interfering with any storage items in integral storage area on the off-road vehicle; and a second vertical connection component of a pre-determined length connected at a first end at a pre-determined angle to a bottom end of the body component and connected at a second end to a connection component with a second clamping component, to securely connect the off-road vehicle utility rack apparatus to a lower horizontal portion structural component of the off-road vehicle, the pre-determined length and the pre-determined angle allowing the off-road vehicle utility rack apparatus to hold the spare tire on the top surface of the body component, the storage container on the bottom surface of the body component and allowing room for other storage items in the integral storage area of the off-road vehicle without interfering with any storage items in the integral storage area on the off-road vehicle.

19. An off-road vehicle utility rack apparatus, comprising in combination:

a horizontal component with a first receptacle at a first end and a second receptacle at a second end for connecting the horizontal component to an existing vertical structural component of an off-road vehicle;

a body component with a first pivot connection component and a second pivot connection component connected to the horizontal component allowing the off-road vehicle utility rack apparatus to be lifted in an upward direction and off the structural component of the off-road vehicle and rotated around the horizontal component in a semi-circular motion;

a first horizontal body component connected at a first pre-determined location within the body component and connected to a first inner surface and a second inner surface of the body component at the first pre-determined location;

the first horizontal body component including a first vertical connection component connected at a first end to the first horizontal body component and at a second end to a circular component for storing a spare tire for the off-road vehicle on a top portion of the body component, the circular component including one or more protruding components for engaging one or more receptacles in a rim of the spare tire to attach the spare tire to a top surface of the circular component;

a second horizontal body component connected at a second pre-determined location on a bottom surface of the body component, the second horizontal body component including one or more receptacles for engaging a first clamping component to connect a storage container to the bottom portion of the body component, the second pre-determined location allowing for storage of items connected to the bottom portion of the body component and the pre-determined location specifically selected to prevent storage of any storage container on the bottom side of the body component from interfering with any storage items in integral storage area on the off-road vehicle; and a second vertical connection component of a pre-determined length connected at a first end at a pre-determined angle to a bottom end of the body component and connected at a second end to a connection component with a second clamping component, to securely connect the off-road vehicle utility rack apparatus to a lower horizontal portion structural component of the off-road vehicle, the second vertical connection component including a telescoping component or a ball and plunger component to allow the pre-determined length of the second vertical connection component to be dynamically adjusted for different sized off-road vehicles, the pre-determined length and the pre-determined angle allowing the off-road vehicle utility rack apparatus to hold the spare tire on the top surface of the body component, the storage container on the bottom surface of the body component and allowing room for other storage items in the integral storage area of the off-road vehicle without interfering with any storage items in the integral storage area on the off-road vehicle.

20. An off-road vehicle utility rack apparatus, comprising in combination:

a horizontal component with a first receptacle at a first end and a second receptacle at a second end for connecting the horizontal component to an existing vertical structural component of an off-road vehicle;

a body component with a first pivot connection component and a second pivot connection component connected to the horizontal component allowing the off-road vehicle utility rack apparatus to be lifted in an upward direction and off the structural component of the off-road vehicle and rotated around the horizontal component in a semi-circular motion;

a first horizontal body component connected at a first pre-determined location within the body component and connected to a first inner surface and a second inner surface of the body component at the first pre-determined location;

the first horizontal body component including a first vertical connection component connected at a first end to the first horizontal body component and at a second end to a circular component for storing a spare tire for the off-road vehicle on a top portion of the body component, the circular component including one or more protruding components for engaging one or more receptacles in a rim of the spare tire to attach the spare tire to a top surface of the circular component;

a second horizontal body component connected at a second pre-determined location on a bottom surface of the body component, the second horizontal body component including one or more receptacles for engaging a first clamping component to connect a storage container to the bottom portion of the body component, the second pre-determined location allowing for storage of items connected to the bottom portion of the body component and the pre-determined location specifically selected to prevent storage of any storage container on the bottom side of the body component from interfering with any storage items in integral storage area on the off-road vehicle; and a second vertical connection component of a pre-determined length connected at a first end at a pre-determined angle to a bottom end of the body component and connected at a second end to a connection component with a second clamping component, to securely connect the off-road vehicle utility rack apparatus to a lower horizontal portion structural component of the off-road vehicle, the first clamping component and the second clamping components including a screw clamping component or a spring-handle clamping component, the pre-determined length and the pre-determined angle allowing the off-road vehicle utility rack apparatus to hold the spare tire on the top surface of the body component, the storage container on the bottom surface of the body component and allowing room for other storage items in the integral storage area of the off-road vehicle without interfering with any storage items in the integral storage area on the off-road vehicle.

* * * * *